United States Patent [19]
del Valle

[11] Patent Number: 4,589,448
[45] Date of Patent: May 20, 1986

[54] FLEXIBLE HELICALLY WOUND HOSE WITH HINGED STRIP

[75] Inventor: Jorge L. del Valle, Burlington, N.C.

[73] Assignee: Electrolux Corporation, Stamford, Conn.

[21] Appl. No.: 634,477

[22] Filed: Jul. 25, 1984

[51] Int. Cl.[4] .............................................. F16L 11/11
[52] U.S. Cl. ..................................... 138/122; 138/129; 138/154
[58] Field of Search ............... 138/121, 122, 129, 154; 174/47

[56] References Cited

U.S. PATENT DOCUMENTS

| | | | |
|---|---|---|---|
| 2,489,277 | 11/1949 | Faralla | 138/121 X |
| 2,731,040 | 1/1956 | Warburton | 138/49 |
| 3,199,541 | 8/1965 | Richitelli | 138/129 |
| 3,255,780 | 6/1966 | Squirrell | 138/122 |
| 3,273,600 | 9/1966 | Swan | 138/122 |
| 3,313,319 | 4/1967 | Osborn et al. | 138/121 |
| 4,079,757 | 3/1978 | Fischer et al. | 138/121 |
| 4,121,624 | 10/1978 | Chen | 138/122 |
| 4,310,946 | 1/1982 | Baker et al. | 15/363 |
| 4,383,555 | 5/1983 | Finley | 138/129 |
| 4,420,019 | 12/1983 | Dillon | 138/129 |

OTHER PUBLICATIONS

Whittington, *Whittington's Dictionary of Plastics*, 1968, pp. 93, 94, 96, 251.

*Primary Examiner*—James E. Bryant, III
*Attorney, Agent, or Firm*—Jeffrey H. Ingerman

[57] ABSTRACT

A helically wound two-piece construction hose is provided, having greater flexibility and resistance to kinking than previous helically wound two-piece construction hoses because of the provision of a hinge in a strip thereof. The hinge is made of a material which is flexible, yet has hardness, strength, and abrasion resistance, and is also resistant to fatigue failure.

13 Claims, 5 Drawing Figures

U.S. Patent  May 20, 1986  4,589,448
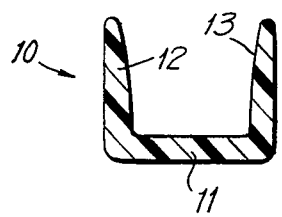
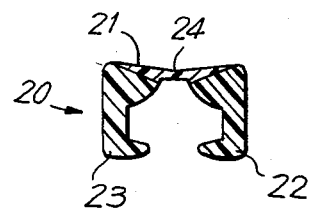
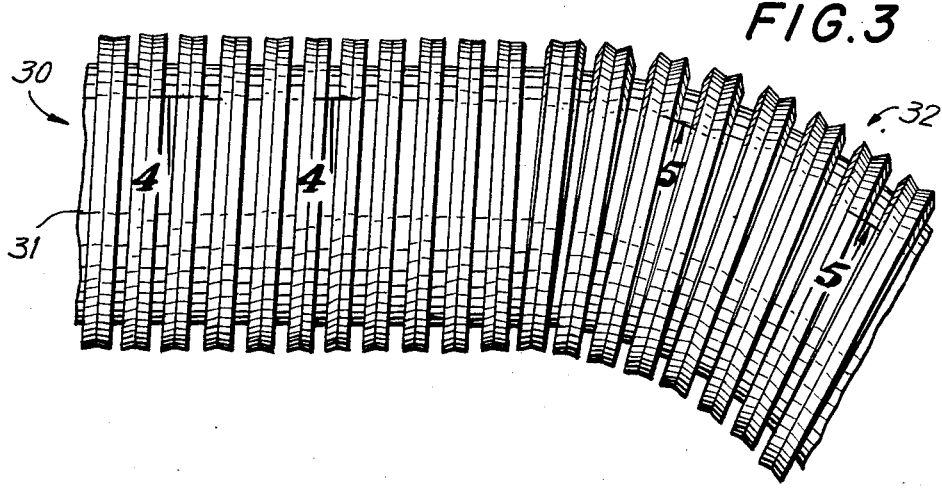
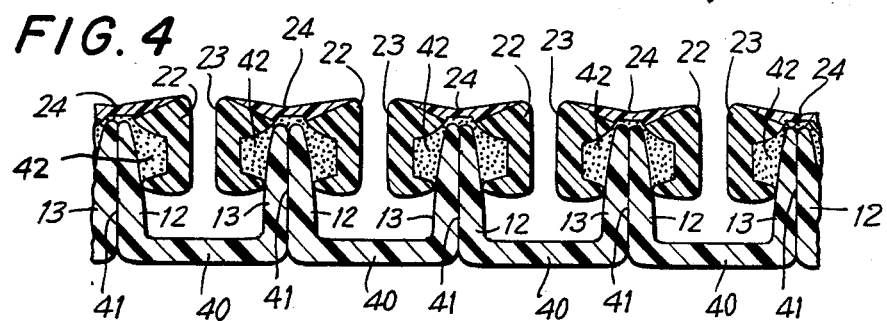
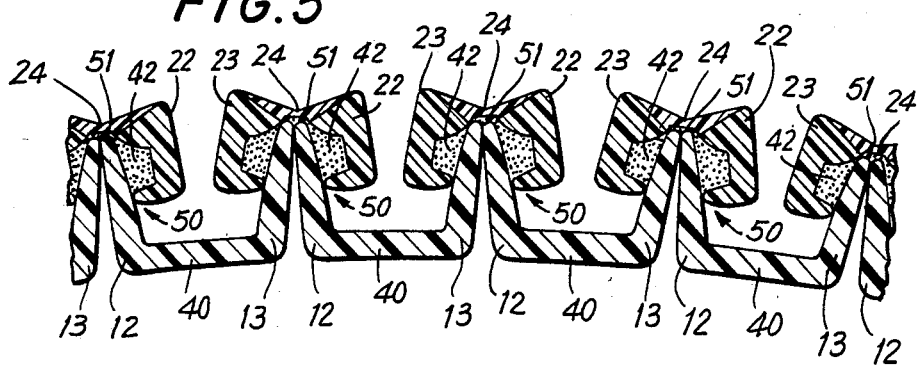

FLEXIBLE HELICALLY WOUND HOSE WITH HINGED STRIP

BACKGROUND OF THE INVENTION

This invention relates to flexible hoses, and more particularly to flexible helically wound two-piece construction hoses, which can be used with vacuum cleaners and for other applications.

Flexible helically wound two-piece construction hoses are known. These include hoses having an inner base strip with a generally U-shaped cross section. The base strip is helically wound to form a tube, with opposite walls of the U-shaped cross section forming a helical radially outwardly extending rib where adjacent convolutions abut. Such hoses also have an outer cap strip which is also elongated and also has a generally U-shape cross section. The cap strip is helically wound about the rib of the tube formed by the wound base strip, with opposite walls of the U-shaped cross section of the cap portion extending radially inwardly toward of the longitudinal axis of the tube on either side of the rib. The cap strip thereby holds together the two walls of the base strip which form the rib, maintaining itself and the base strip in tubular form. The cap strip is secured to the rib by a binding material, which could be a hot melt plastic, which fills the space between the rib and the cap and, in some cases, extends part of the way into the space between the walls that form the rib.

When a helically wound dual profile hose is flexed, the flexing action includes a spreading of the walls that form the rib in the portion of the rib inward of the cap structure. In some of the previously known helically wound two-piece construction hoses, the cap structure also will flex if the walls are spread under extreme axial tension. In others, the cap structure, especially when filled with the binding material, is rigid. Rigidity of the cap has been considered necessary in these latter hoses in order to resist crushing and kinking of the hose and to provide abrasion resistance. However, the rigidity of the cap limits the degree to which the walls that form the rib can spread, thereby limiting the flexibility of the hose.

SUMMARY OF THE INVENTION

In accordance with the present invention, there is provided a flexible two-piece construction hose having an elongated base member of a first polymeric material. The base member has a base web portion and first and second wall portions which extend along the base member, projecting in substantially the same direction from the margins of the base web portion. The base member is helically wound to form a tube, with the wall portions extending radially outward from the longitudinal axis of the tube. The first wall portion of the base member in a first convolution is adjacent to the second wall portion in a second convolution adjacent to the first convolution, so that the adjacent wall portions form a continuous helical rib along the tube.

The hose also has an elongated cap member having a cap web portion and first and second flange portions extending along the cap member, projecting in substantially the same direction from the margins of the cap web portion. The cap member is wound on the rib formed by the base member wall portions, with the first and second flange portions extending radially inwardly toward the longitudinal axis of the tube on opposite sides of the rib. The first and second flange portions are each bound to a respective one of the first and second wall portions by a binding material which is deposited substantially only in the region defined by the first and second wall portions and the cap member, leaving the junction between the first and second wall portions substantially free of binding material.

Preferably, the flange portions comprise a second polymeric material. The cap web portion comprises a hinge section, preferably of a third polymeric material which is coextruded with the flange portions and is harder than the second polymeric material. The thickness of the hinge section is substantially less than the thickness of the flange portions, so that the cap member flexes to act as a hinge, allowing adjacent pairs of first and second wall portions to separate along their widths when the hose is flexed.

Preferably, the second polymeric material is the same as the first polymeric material, and is a mixture of linear low density polyethylene and a polyethylene copolymer selected from the group consisting of ethylene-vinyl acetate copolymer, ethylene-ethyl acrylate copolymer, and mixtures thereof. The third polymeric material is preferably harder than the second polymeric material and is preferably a mixture comprising from about 30% to about 70% high modulus polypropylene and from about 70% to about 30% of the second polymeric material, and more preferably about 70% high modulus polypropylene and about 30% of the second polymeric material, by weight, exclusive of coloring, lubricant, and ultraviolet protection additives.

It is an object of this invention to provide a helically wound hose having greater flexibility and resistance to kinking than previously known hoses of such construction.

It is a further object of this invention to provide such a hose while maintaining or exceeding the abrasion resistance of previously known helically wound hoses.

BRIEF DESCRIPTION OF THE DRAWINGS

These and other objects and advantages of the present invention will be apparent after consideration of the following detailed description of the preferred embodiment, taken along with the accompanying drawings, in which like reference characters refer to like parts throughout, and in which:

FIG. 1 is a cross-sectional view of the base member of a two-piece construction hose according to the invention;

FIG. 2 is a cross-sectional view of the cap member of a two-piece construction hose according to the invention;

FIG. 3 is an elevational view of a portion of a two-piece construction hose according to the present invention, part of which is straight and part of which is flexed;

FIG. 4 is a fragmentary cross-sectional view taken from line 4—4 of FIG. 3; and

FIG. 5 is a fragmentary cross-sectional view taken from line 5—5 of FIG. 3.

DETAILED DESCRIPTION OF THE PREFERRED EMBODIMENT

Flexible two-piece construction hose according to the present invention is made of an elongated base member 10, shown in cross section in FIG. 1, and an elongated cap member 20, shown in cross section in FIG. 2. Base member 10, which is made of a first polymeric material, has a base web portion 11, and a first wall portion 12 and second wall portion 13 projecting in substantially the same direction from the web portion 11 and extending along the length of base member 10. As shown in the drawings, first and second wall portions 12, 13 are perpendicular to base web portion 11, but they need not be; they need only extend in substantially the same direction from base web portion 11.

Cap member 20, which is made of a second polymeric material, has a cap web portion 21, and first and second flange portions 22, 23. The relationship of flange portions 22, 23 to cap web portion 21 is similar to that of wall portions 12, 13 to base web portion 11—i.e., first and second flange portions 22, 23 project in substantially the same direction, here shown as perpendicular, from cap web portion 21, and extend along the length of cap member 20. Cap web portion 21 has a hinge section 24 which is made thin enough to be flexible, and which is preferably made of a third polymeric material which is coextruded with flange portions 22, 23 and is harder than the second polymeric material. The entire cap could be made of the third, harder material.

Hose 30, a portion of which is shown in FIG. 3, is formed by helically winding base member 20 to form a tube 31, with wall portions 12, 13 projecting radially outward from the longitudinal axis (not shown) of tube 31. As seen in FIG. 4, first wall portion 12 in each convolution 40 of tube 31 is adjacent second wall portion 13 of an adjacent convolution 40, forming a rib 41. Rib 41 extends around hose 30 in a continuous helix.

Tube 31 is prevented from unwinding by cap member 20, which is helically wound around rib 41. Flange portions 22, 23 extend radially inwardly toward the longitudinal axis of tube 31 along opposite sides of rib 41, so that each of the first and second flange portions 22, 23 is adjacent to a respective wall portion 12, 13. Cap member 20 is held in place on rib 41 by a binding material 42 which fills the space defined by rib 41 and cap member 20. The region between the wall portions 12, 13 forming the rib 41 is substantially free of binding material. The bound helical structure formed by wall portions 12, 13 and flange portions 22, 23 imparts crush resistance to the hose.

FIG. 4 shows the cross section of hose 30 in its unflexed condition. When hose 30 is flexed, as at 32 in FIG. 3 (shown in detail in FIG. 5), hinge 24 bends to permit wall portions 12, 13 of rib 41 to separate freely up to their radially outwardmost edges, at 51. Hinge 24 is designed to be flexible and fatigue resistant to readily permit the hinge action and to be long lasting. Previously known two-piece construction hoses have been designed to avoid flexing of the cap web portion under ordinary use. For example, some of the previously known hoses have binding material between wall portions 12, 13 in the region between points 50 and 51, limiting the ability of the wall portions 12, 13 to separate. Other previously known hoses will have some flexing in the cap web portion when the hose is subjected to extreme axial tension. The present hose is specifically designed with a hard, fatigue resistant hinged strip which readily flexes with the hose in ordinary use, and the region between wall portions 12, 13 of the present hose is substantially free of binding material, making the hose very flexible and durable.

Preferably, the second polymeric material of cap member 20 is the same as the first polymeric material and is a polyethylene mixture. Most preferred is a mixture of linear low density polyethylene and a polyethylene copolymer selected from the group consisting of ethylene-vinyl acetate copolymer, ethylene-ethyl acrylate copolymer, and mixtures thereof. This material has the modulus and strength of polyethylene, as well as abrasion resistance, but has the warmer feel of vinyl, making it more pleasing to the touch of the user. Also preferably, the binding material is a hot melt of the polyethylene mixture, which is supplied to the region of cap member 20 by a small extruder.

The third polymeric material, from which hinge 24 is made, preferably comprises high modulus (hard) polypropylene, which is strong, abrasion resistant, and resistant to fatigue failure, even when made thin enough to be flexible. In order for the hinge 24 to adhere strongly to the remainder of cap member 20, it should also preferably comprise some of the same material of which the remainder of cap member 20 is made. Therefore, the hinge section 24 preferably comprises from about 30% to about 70% high modulus polypropylene, and from about 70% to about 30% of the second polymeric material, by weight, exclusive of coloring and lubricant additives and additives to protect the hose against degradation by the ultraviolet radiation in sunlight. More preferably, hinge section 24 comprises about 70% high modulus polypropylene, and about 30% of the second polymeric material, by weight, exclusive of additives.

The coextruder section can make up the entire cap web portion 21, or it can be only a part of it. One factor which imposes a lower limit on the size of the coextruded section is that it must have sufficiently large bonding area for proper adhesion to the remainder of cap member 20. However, adhesion is assured mainly by proper formulation of the third polymeric material. The upper limit is governed by the need, if any, for the properties of the second polymeric material in cap web portion 21 and the extent to which those properties are lacking in the third polymeric material, which need may require that a certain minimum amount of cap web portion 21 be made exclusively of the second polymeric material.

Elongation of a material is a function of load, cross-sectional area of the material, stress, and modulus. By using a harder, more stress-resistant material in the hinge section of the present hose than in the remainder of the hose, and by properly controlling the composition of that material, it is possible to distribute the stress of flexing to achieve uniform elongation of all portions of the hose, increasing its flex life, despite the varying cross-sectional areas of the different parts of the hose.

The present invention thus provides a helically wound two-piece construction hose having greater flexibility and resistance to kinking than previously known helically wound two-piece construction hoses, while at the same time maintaining desired levels of strength, abrasion resistance, and crush resistance.

The present invention has been described with reference to certain preferred embodiments thereof; however, one skilled in the art will recognize that those embodiments are illustrative only, and that the present invention can be practiced by other than the embodiments shown. The present invention is not limited by those embodiments, but only by the scope of the claims which follow.

What is claimed is:
1. A flexible hose, comprising:
   an elongated base member of a first polymeric material, said base member having a base web portion including parallel longitudinally extending mar- gins, and first and second wall portions each having inward and outward faces extending along said base member projecting in substantially the same direction from the margins of said base web portion, said base member being substantially helically wound to form a tube, said wall portions extending substantially radially outwardly from the longitudinal axis of said tube, an outward face of said first wall portion of said base member in a first convolution being adjacent to an outward face of said second wall portion of said base member in a second convolution, said first and second wall portions thereby forming a continuous helical rib along said tube; and an elongaged cap member having a cap web portion including parallel longitudinally extending margins, and first and second flange portions extending along said cap member projecting in substantially the same direction from the margins of said cap web portion, said cap member being wound on said rib, said first and second flange portions extending radially inward toward said longitudinal axis along respective opposite sides of said rib to a radially inwardmost point of contact with said first and second wall portions, each of said first and second flange portions being bound to a respective one of said first and second wall portions by a binding material which is deposited substantially only in the region defined by said inward faces of said first and second wall portions and said cap member, said adjacent outward faces of said first and second wall portions being substantially free of binding material at least between said margins of said base web portion and a point substantially radially outward of said inwardmost point of contact;

said flange portions comprising a second polymeric material and said cap web portion comprising a hinge section of a third polymeric material coextruded with said flange portions, said hinge section having a thickness substantially less than the thickness of said flange portions, whereby said cap member flexes to permit separation of said adjacent first and second wall portions along their widths when said hose is flexed.

2. The flexible hose of claim 1 wherein said third polymeric material is harder than said second polymeric material.

3. The flexible hose of claim 1 wherein said first polymeric material is a mixture of linear low density polyethylene and a polyethylene copolymer selected from the group consisting of ethylene-vinyl acetate copolymer, ethylene-ethyl acrylate copolymer, and mixtures thereof.

4. The flexible hose of claim 1 wherein said second polymeric material is said third polymeric material.

5. The flexible hose of claim 1 wherein said second polymeric material is a mixture of linear low density polyethylene and a polyethylene copolymer selected from the group consisting of ethylene-vinyl actetate copolymer, ethylene-ethyl acrylate copolymer, and mixtures thereof.

6. The flexible hose of claim 1 wherein said second polymeric material is said first polymeric material.

7. The flexible hose of claim 6 wherein said binding material is a hot melt of said first polymeric material which is extruded into the region defined by said first and second wall portions and said cap member.

8. The flexible hose of claim 1 wherein said third polymeric material comprises from about 30% to about 70% high modulus polypropylene, by weight.

9. The flexible hose of claim 8 wherein said third polymeric material further comprises from about 70% to about 30% of said second polymeric material, by weight.

10. The flexible hose of claim 8 wherein said third polymeric material comprises about 70% high modulus polypropylene, by weight.

11. The flexible hose of claim 10 wherein said third polymeric material further comprises about 30% of said second polymeric material, by weight.

12. The flexible hose of claim 1 wherein said first and second wall portions extend substantially perpendicularly from said base web portion, and said first and second flange portions extend substantially perpendicularly from said cap web portion.

13. A flexible hose, comprising:

an elongated base member of a first polymeric material, said first polymeric material being a mixture of linear low density polyethylene and a polyethylene copolymer selected from the group consisting of ethylene-vinyl acetate copolymer, ethylene-ethyl acrylate copolymer, and mixtures thereof, said base member having a base web portion including parallel longitudinally extending margins, and first and second wall portions each having inward and outward faces extending along said base member substantially perpendicularly from the margins of said base web portion in substantially the same direction, said base member being substantially helically wound to form a tube, said wall portions extending substantially radially outwardly from the longitudinal axis of said tube, an outward face of said first wall portion of said base member in a first convolution being adjacent to an outward face of said second wall portion of said base member in a second convolution, said first and second wall portions thereby forming a continuous helical rib along said tube; and an elongated cap member having a cap web portion including parallel longitudinally extending margins, and first and second flange portions extending along said cap member substantially perpendicularly from the margins of said cap web portion in substantially the same direction, said cap member being wound on said rib, said first and second flange portions extending radially inwardly toward said longitudinal axis along respective opposite sides of said rib, each of said first and second flange portions being bound to a respective one of said first and second wall portions by a hot melt material which is extruded substantially only into the region defined by said inward faces of said first and second wall portions and said cap member, said adjacent outward faces of said first and second wall portions being substantially free of binding material;

said flange portions and said hot melt material being made of said first polymeric material and said cap web portion comprising a hinge section of a second polymeric material coextruded with said flange portions, said second polymeric material being harder than said first polymeric material and comprising about 70% high modulus polypropylene and about 30% of said first polymeric material, by weight, said hinge section having a thickness substantially less than the thickness of said flange portions, whereby said cap member flexes to permit separation of said adjacent outward faces of said first and second wall portions along their widths when said hose is flexed.

* * * * *